(No Model.)
T. B. JEFFERY.
PNEUMATIC TIRE AND DEVICE FOR INFLATING SAME.
No. 502,003. Patented July 25, 1893.
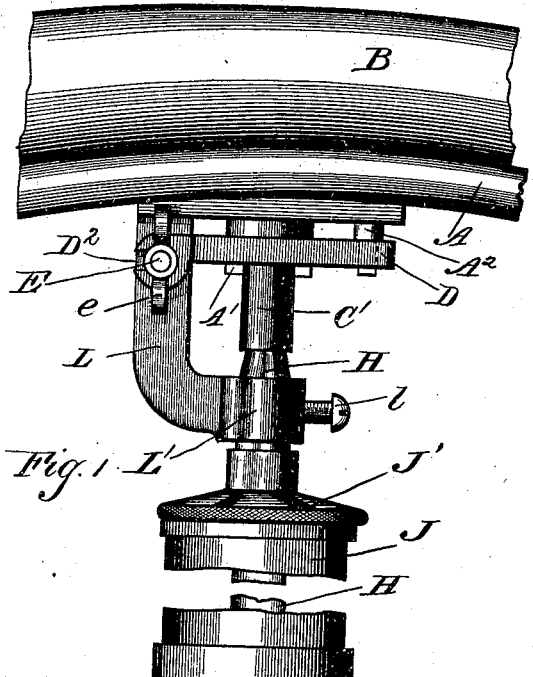
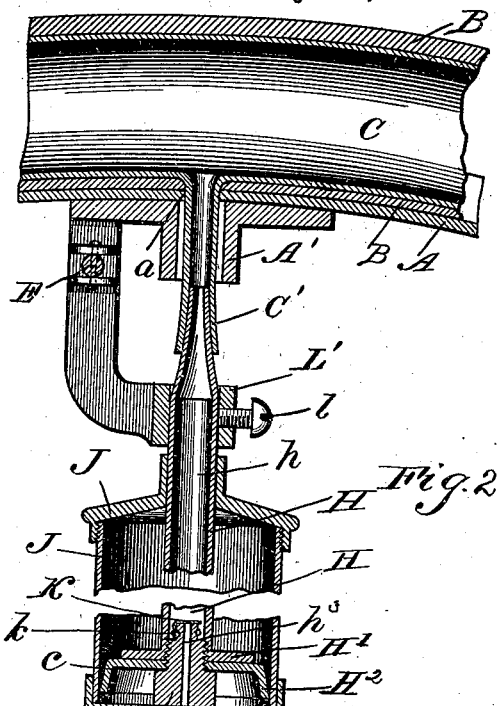
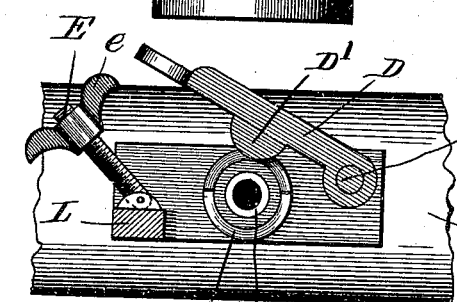
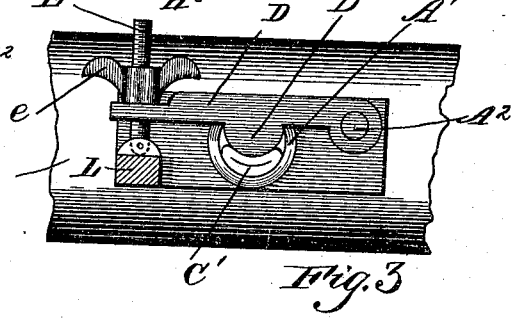
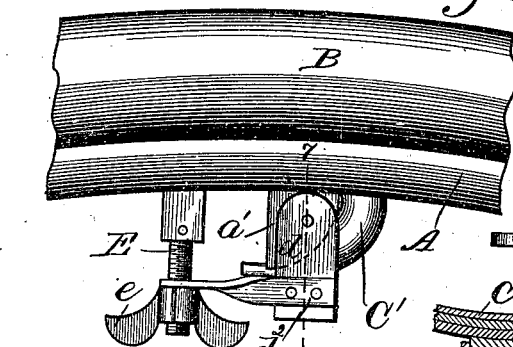
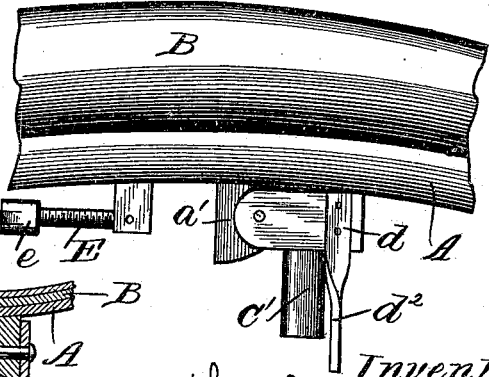
Witnesses.
Jean Elliott
J. L. Tunison
Inventor.
Thos. B. Jeffery
By Burton & Burton
his attorneys

UNITED STATES PATENT OFFICE.

THOMAS B. JEFFERY, OF CHICAGO, ILLINOIS.

PNEUMATIC TIRE AND DEVICE FOR INFLATING SAME.

SPECIFICATION forming part of Letters Patent No. 502,003, dated July 25, 1893.

Application filed August 5, 1891. Renewed May 16, 1892. Serial No. 433,123. (No model.)

*To all whom it may concern:*

Be it known that I, THOMAS B. JEFFERY, a citizen of the United States, residing at Chicago, county of Cook, and State of Illinois, have invented certain new and useful Improvements in Devices for Inflating and Retaining the Air in Inflatable Tires, which are fully set forth in the following specification, reference being had to the accompanying drawings, forming a part thereof.

The purpose of this invention is to provide an improved construction for an inflatable tire, and a device for conveniently inflating the same and retaining the air therein.

In the drawings, Figure 1 is a side elevation of a segment of a tire having my improved device. Fig. 2 is a section through the same in a medial plane at right angles to the axis of the wheel. Fig. 3 is a section at the line 3—3 on Fig. 1, showing the inlet tube locked or closed by the devices for that purpose. Fig. 4 is a view similar to Fig. 3, but showing the inlet tube open. Fig. 5 is a detail side elevation of a modified form of the device for closing the inflating tube, showing the same open or in position for inflating. Fig. 6 is a similar view of the same device but in closed position. Fig. 7 is a section at the line 7—7 on Fig. 6.

A is the wheel rim.

B is the tire sheath.

C is the inflatable core within the sheath. (It will be understood that the sheath and core may be integral, which amounts practically to omitting the core and inflating the sheath directly. Such change would not affect my invention.) The inflatable core or tube is provided with a branch or inlet tube $C'$, which as illustrated and preferably, is molded integrally with the core and projects from its inner circumference radially toward the center of the wheel, as seen in the drawings. This inlet tube is elastically compressible, being of the same material as the core, and adapted to be folded and pinched as hereinafter described. The rim A has the aperture $a$, through which this inlet protrudes toward the center of the wheel. In the preferred form of my invention an annular boss $A'$ encircles the aperture $a$ on the inner surface,—that is, opposite the tire seat of the wheel. This boss may be partly cut away at one side leaving the other side standing as a backing for the nozzle $C'$, against which it may be compressed.

D is a clamping lever pivoted on the stud $A^2$, which projects from the rim. This lever has the semi-circular tongue $D'$ of such size and at such position that it may enter the half which is left standing of the boss $A'$, but being enough smaller than the annular opening through said boss or than the size of the inlet, which is substantially the same, so that said inlet being compressed, as seen in Fig. 3, against the boss $A'$, finds sufficient room between the said boss and said tongue, as seen in said figure.

E is a clamping screw, which is pivotally connected to the rim, and has the thumb nut $e$, so that the screw being rocked on its pivot into the notch $D^2$, the nut will serve to draw the lever toward the boss $a'$, which constitutes the other member of the clamping device, and to force the tongue $D'$ into the boss $A'$, to pinch or close the inlet tube $C'$ against the boss and thereby completely close up its aperture to retain the air in the inflated core. A modified form of this device is shown in Figs. 5 and 6, wherein, instead of the clamping lever swinging about a pivot radial with respect to the wheel and in a plane transverse to the wheel, it swings about a horizontal pivot and in the plane of the wheel, and the support against which the inlet tube is clamped is accordingly changed in position, being situated at one side of the aperture $a$ in the direction of the circumference of the wheel, and being preferably a grooved block $a'$, whose periphery is the segment of a circle eccentric with respect to the pivot of the lever, the lever being in the form of a yoke $d$, and having at its middle point a tongue $d'$, which compresses the inlet tube $C'$ into the eccentric groove of the block $a'$ as the lever is rocked over the latter. The lever has the arm $d^2$, with which the clamp screw E and nut $e$ co-operate, as in the form shown in the other figures.

For the purpose of inflating the tire through the medium of the nozzle $C'$, I provide a force pump which comprises the piston rod H, which has the longitudinal duct $h$, and constitutes the discharge nozzle of the pump and is adapted to be inserted in the inlet tube C' and fit sufficiently tightly therein to prevent leakage of air around it when such degree of pressure is produced in the inflatable core as is necessary. This piston rod has at its inner or piston end,—that is, the end which will be toward the center of the wheel when the device is in use for inflation,—the piston which consists of the flange H' rigid with the tube H, and the cup leather or piston proper, H², which is bound at the center to the flange H' by the binding screw H³, which screws into the end of the duct $h$ of the nozzle or piston rod, and has, itself, the axial aperture $h^3$, through which the air is admitted into the duct. The pump cylinder J receives the piston at the end which in the drawings is covered by the removable cap J', said cap, however, serving no purpose except as a guide bearing for the rod H. It will be observed that the cup-leather piston H² is open inward with respect to the cylinder J,—that is, toward the closed end or head J²,—and therefore is adapted to be expanded outward by the compression of air between it and the head or closed end of the cylinder, but that as the cylinder is withdrawn, the air will readily find its way past the cup leather in the opposite direction, so that this cup leather operates practically as a check valve, admitting the air past it in one direction only, and serving as a perfectly fitting piston when the cylinder is moved in the opposite direction.

I provide for the aperture $h^3$ of the binding screw, a valve of any convenient construction adapted to be closed by pressure within the air tube and to open to admit the air into said tube through the axial aperture in the binding screw. As illustrated, and as found entirely satisfactory, this valve consists merely of an air proof membrane, as oiled silk or bladder K, which is folded over the inner end of the aperture $h^3$ and bound by a thread $k$ wound around the inner end of the binding screw in the groove provided for that purpose, one edge of the membrane being left free, so that the air will be forced out past it. I do not limit myself to this form of valve.

The rim may be provided with a bracket L, which stands up, that is, radially, adjacent to the aperture $a$, and projecting around into radial line with it, has the eye L' in radial line with said aperture, said eye being of such size as to receive and afford a supporting seat for the nozzle H, of the pump, which, being inserted through it, is held rigidly in line with the nozzle C', when the latter is free from the clamp, as when inflation is being performed. A clamp screw $l$ set through the substance of the eye L' of the bracket, serves to retain the air tube in position, and by being slackened, permits its withdrawal, so that the nozzle C' may be folded down for the purpose of pinching it shut, when the form shown in Figs. 5, 6 and 7 is used, but when the form shown in the other figures is used, the air tube need not be withdrawn at all from the nozzle, the latter being pinched between the end of the air tube and the aperture $a$ in the tire.

I claim—

1. In combination with the rim, the inflatable tire seated therein having a compressible inlet tube leading from its inflation cavity to the side of the rim opposite the tire seat, and a clamp whose members are connected to the rim to receive and clamp the inlet tube: substantially as set forth.

2. In combination with the wheel rim, the tire seated therein comprising an inflatable tube provided with a compressible inlet tube which leads from the inflation cavity through the rim, the rim having a seat or bearing adjacent to the inlet tube at its emergence through the rim, and adapted to support it at one side; and a clamp adapted to compress the inlet tube against such seat or bearing: substantially as set forth.

3. In combination with an inflatable tire having a compressible inflating tube, the rim in which such tire is seated having an aperture through which the inlet tube protrudes, and a marginal boss about one side of said aperture on the surface of the rim opposite the tire seat, and a lever pivoted to the rim and having a tongue corresponding to the concavity of the marginal boss to compress the inlet tube against said boss when the lever is moved on its pivot toward the latter: substantially as set forth.

4. In combination with the wheel rim, the inflatable tire seated therein having a compressible tube leading to its cavity; a clamp mounted on the rim and adapted to grasp the inlet tube, and provided with a screw to draw and hold its members together to compress the inlet tube between them: substantially as set forth.

5. In combination with an inflatable tire, the rim in which it is seated having an aperture through which access is gained to the cavity of the tire, and a bracket projecting from the rim opposite the tire seat, and provided with a seat or bearing in line with said aperture in the rim adapted to receive the nozzle of the inflating pump and direct it toward said aperture: substantially as set forth.

6. In combination with the inflatable tire, the inflating pump cylinder, its piston-rod having a longitudinal duct and constituting the discharge nozzle; and a check valve in such duct at the piston end and opening toward the other end: substantially as set forth.

7. In combination with the inflatable tire having an inlet tube which leads to its cavity, the rim in which such tire is seated having an aperture for the inlet tube; an inflating pump, the nozzle of which enters the inlet tube; and a clamp whose members are secured to the rim and which is adapted to grasp and clamp the inlet tube between the end of the nozzle and the rim: substantially as set forth.

8. In combination with the rim, the inflatable tire seated therein having a valveless compressible inlet tube; the pump cylinder, its piston rod having a longitudinal duct and constituting the discharge nozzle adapted to be inserted in the mouth of the inlet tube; a check valve in said duct at the piston end opening toward the other end, and a clamp to compress the inlet tube between the rim and the pump nozzle: substantially as set forth.

9. In a wheel tire, an inflatable tube having an inlet tube which constitutes also an unobstructed outlet from the tire cavity; a clamp permanently connected to the wheel and adapted to contract such inlet to prevent the escape of air therethrough: substantially as set forth.

In testimony whereof I have hereunto set my hand, in the presence of two witnesses, at Chicago, Illinois, this 1st day of August, A. D. 1891.

THOS. B. JEFFERY.

Witnesses:
  CHAS. S. BURTON,
  J. L. TUNISON.